United States Patent Office 3,397,992
Patented Aug. 20, 1968

3,397,992
LACTALBUMIN AND LACTOGLOBULIN FREE DRINK
Peter P. Noznick, Evanston, and Charles W. Tatter, Homewood, Ill., assignors to Beatrice Foods Co., Chicago, Ill., a corporation of Delaware
No Drawing. Continuation-in-part of application Ser. No. 356,058, Mar. 31, 1964. This application July 5, 1967, Ser. No. 651,155
18 Claims. (Cl. 99—63)

ABSTRACT OF THE DISCLOSURE

A lactalbumin and lactoglobulin free composition suitable for use as a milk substitute comprising fat, a polyglycerol partial higher fatty acid ester and colloidal cellulose dispersed in water.

---

This application is a continuation-in-part of Noznick et al. application Ser. No. 356,058, filed Mar. 21, 1964.

The present invention relates to the preparation of imitation milk.

Many people are allergic to lactalbumin and/or lactoglobulin.

It is an object of the present invention to prepare a product simulating milk which does not contain lactalbumin or lactoglobulin.

Another object is to prepare a dietetic drink which is protein free.

A further object is to prepare a simulated milk containing no source of milk protein.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a drink from a polyglycerol ester of a higher fatty acid, a vegetable fat, colloidal cellulose and water. Preferably dextrins (carbohydrates) are present and it is also preferable, except in the case of the preparation of a non-protein dietetic drink to include a protein other than lactalbumin or lactoglobulin. Normally carboxymethyl cellulose (usually as the sodium salt) is also included.

The preferred form of the colloidal cellulose is Avicel RC which is composed of 92% microcrystalline cellulose and 8% sodium carboxymethyl cellulose. Because of the fine particle size of the Avicel RC there is no problem in drinking the imitation milk.

The preferred emulsifying agent is decaglycerol decastearate but there can also be employed other diglycerol to triconto glycerol esters of fatty acids containing 12 to 22 carbon atoms in the fatty acid. Examples of suitable polyglycerol esters are triglycerol monostearate, triglycerol monoshortening (triglycerol mono ester of the acids of cottonseed oil), triglycerol monooleate, hexaglycerol monostearate, hexaglycerol monoshortening, hexaglycerol monooleate, hexaglycerol dioleates, hexaglycerol dishortening, hexaglycerol distearate, decaglycerol monostearate, decaglycerol monoshortening, decaglycerol monooleate, decaglycerol trilaurate, decaglycerol tristearate, decaglycerol trishortening, decaglycerol trioleate, decaglycerol trilinoleate, decaglycerol tetraoleate, diglycerol monostearate, decaglycerol tripalmitate, dodecaglycerol hexastearate, decaglycerol diarachinate, triglycerol mono behenate, dodecaglycerol trilignocerate, decaglycerol monolinolenate, hexaglycerol diricinooleate, decaglycerol trimyristate, decaglycerol triester of soybean oil fatty acids, decaglycerol tetraester of cottonseed oil fatty acids, hexaglycerol monoester of coconut oil acids, triglycerol monoester of peanut oil acids, decaglycerol triester of corn oil acids, decaglycerol triester of hydrogenated cottonseed oil acids, decaglycerol decaoleate, decaglycerol decapalmitate, decaglycerol ester of soybean oil fatty acids.

The term fat as used in the present specification and claims includes both liquid and solid fats. Among the suitable edible fats which can be used are cottonseed oil, coconut oil, safflower oil, corn oil, soybean oil, peanut oil, hydrogenated cottonseed oil, hydrogenated soybean oil, hydrogenated peanut oil, olive oil, hydrogenated olive oil, hydrogenated coconut oil, e.g., hydrogenated to a melting point of 92° F. There can also be used animal fats such as butterfat and lard.

As the carbohydrate, there can be used corn syrups with D.E. values of 12 to 70, canary dextrins, yellow dextrins, and the like. The low D.E. value corn syrup dextrins are preferred. The dextrin, however, can be prepared from tapioca, wheat, rice, sorghum, sago, potato, arrowroot, waxy maize or waxy sorghum starches or mixtures thereof.

It has been found that the D.E. equivalent has a profound effect on the emulsion stability in that the greater the amount of monosaccharide present the harder it is to properly emulsify the composition. Hence the use of corn syrups with very low monosaccharide content is preferred. Illustrative of preferred corn syrups are Frodex 15 (corn syrup with a D.E. of 15) and Mor-rex 1913 and 1918 both of which have a low monosaccharide content.

Additional flavoring and color agents can be added to simulate fresh milk but they are not essential and do not contribute to stability of the emulsion.

It has also been found that emulsion stability can be improved by adding a citrate-phosphate buffer. Thus there can be used citric acid-tetrasodium pyrophosphate or citric acid-disodium phosphate. Preferably sodium chloride is included with these buffers. The buffers (and sodium chloride) also improve the overall flavor of the product and make it less bland or dry to the taste.

The citric acid can be used in an amount of .01 to 0.2% of the mixture the sodium phosphate component can be used in an amount of .05 to .3% of the mixture and the salt can be used in an amount of .01 to 0.2% of the mixture.

When a protein is employed it is preferably sodium caseinate although there can also be used soybean protein, calcium ammonium and potassium caseinates, low viscosity gelatin, fish protein, wheat gluten or corn gluten. Next to sodium caseinate the preferred protein is soybean protein.

The most convenient method for preparing the compositions of the present invention is to dissolve the emulsifier, e.g., decaglycerol decastearate, in the melted fat. The remaining ingredients are dispersed in water and heated, e.g., to 150–160° F. Then the fat and aqueous materials are combined and pasteurized, e.g., at 155–160° F. per 30 minutes. The product is then homogenized, e.g., at 2000–3000 p.s.i., and chilled over a surface cooler, i.e., chilled immediately to about 40° F. and shipped as such.

The proportions of materials are as follows:

| | Percent |
|---|---|
| Fat | 1 to 5, preferably 3 to 3.5. |
| Polyglycerol esters | 0.02 to 1.0, preferably 0.05 to 0.3. |
| Colloidal cellulose | 0.2 to 2.0, preferably 0.3 to 1.0. |
| Protein | 1 to 4 (can be omitted). |
| Corn syrup solids | 1 to 10 (can be omitted). |
| Carboxymethylcellulose | 0.02 to 0.15 (can be omitted). |
| Water | Balance. |

The water is usually 82.5 to 94.5% if protein is present and 85 to 95% if the protein is omitted.

Unless otherwise indicated all parts and percentages are by weight.

EXAMPLE 1

| | Percent |
|---|---|
| 92° coconut oil | 3.4 |
| Decaglycerol tristearate | 0.1 |
| Frodex 24 (corn dextrin solids D.E. 24) | 5.0 |
| Avicel RC | 0.4 |
| Sodium caseinate | 3.5 |
| Water | 87.6 |

The decaglycerol tristearate was dissolved in the melted coconut oil. The Frodex 24, Avicel RC and sodium caseinate were dispersed in water and heated to 155° F. The decaglycerol tristearate in the coconut oil was then added and the mixture pasteurized at 155–160° F. for 30 minutes, homogenized at 2500 p.s.i. and chilled over a surface cooler to 40° F.

The product was similar to milk in appearance and was a satisfactory milk substitute for people who cannot eat lactalbumin and lactoglobulin.

EXAMPLE 2

| | Percent |
|---|---|
| 92° coconut oil | 3.15 |
| Decaglycerol decastearate | 0.20 |
| Corn products 1918 corn syrup solids | 5.5 |
| Sodium caseinate | 2.8 |
| Avicel RC | 0.5 |
| Water | 87.85 |

The emulsion was prepared in the same manner as in Example 1.

EXAMPLE 3

| | Percent |
|---|---|
| 92° coconut oil | 3.10 |
| 10-19-S (decaglycerol decastearate) | .2 |
| Sodium caseinate | 2.8 |
| Frodex 24 | 5.0 |
| Avicel RC | .5 |
| Citric acid | .03 |
| Tetrasodium pyrophosphate | .07 |
| Salt | .025 |
| Water | 88.275 |

The emulsion was prepared in the same manner as in Example 1. The citric acid, tetrasodium pyrophosphate and salt were added to the water dispersion prior to adding the coconut oil.

What is claimed is:

1. A lactalbumin and lactoglobulin free composition suitable for use as a milk substitute comprising 1 to 5% of a fat, 0.02 to 1% of a polyglycerol partial higher fatty acid ester and 0.2 to 2% of colloidal cellulose dispersed in water.

2. A composition according to claim 1 including a citrate-phosphate buffer.

3. A composition according to claim 2 including salt in an amount sufficient to impart flavor.

4. A milk substituted according to claim 1 wherein the fat is a vegetable fat.

5. A composition according to claim 4 wherein the polyglycerol ester is decaglycerol decastearate.

6. A milk substitute according to claim 4 which is protein free.

7. A milk substitute according to claim 6 including corn syrup solids.

8. A milk substitute according to claim 7 including carboxymethylcellulose.

9. A milk substitute according to claim 8 wherein the fat is 3 to 3.5%, the corn syrup solids are 1 to 10% and the water is 85 to 95%.

10. A milk substitute according to claim 1 including a protein selected from the group consisting of sodium caseinate and nonmilk proteins.

11. A composition according to claim 10 containing 3 to 3.5% fat, 0.05 to 0.5% polyglycerol partial higher fatty acid ester, 1 to 10% corn syrup solids, 1 to 4% protein, 0.2 to 2.0% colloidal cellulose and 82.5–94.5% water.

12. A composition according to claim 10 including carboxymethyl cellulose.

13. A composition according to claim 1 wherein there is 3 to 3.5% fat, 0.05 to 0.5% polyglycerol partial higher fatty acid ester, 1 to 10% corn syrup solids of 12 to 70 D.E. value.

14. A composition according to claim 13 which is protein free.

15. A composition according to claim 13 including a protein selected from the group consisting of sodium caseinate and nonmilk proteins.

16. A composition according to claim 13 including a citrate-phosphate buffer.

17. A composition according to claim 16 which is protein free.

18. A composition according to claim 16 including sodium caseinate.

References Cited

UNITED STATES PATENTS

| 2,868,653 | 1/1959 | Diamond et al. | 99—139 |
| 2,903,358 | 9/1959 | Block | 99—54 |
| 3,230,090 | 1/1966 | Weiss | 99—139 XR |

RAYMOND N. JONES, *Primary Examiner.*

J. M. HUNTER, *Assistant Examiner.*